United States Patent
Masum-Thomas et al.

(10) Patent No.: US 6,624,928 B1
(45) Date of Patent: Sep. 23, 2003

(54) RAMAN AMPLIFICATION

(75) Inventors: Jowan Masum-Thomas, Halstead (GB); Andrew V Maroney, South Woodford (GB); Richard Thomas, Halstead (GB); Christopher R Fludger, South Croydon (GB)

(73) Assignee: Nortel Networks Limited, St. Laurent (CA)

( * ) Notice: Subject to any disclaimer, the term of this patent is extended or adjusted under 35 U.S.C. 154(b) by 46 days.

(21) Appl. No.: 09/864,843

(22) Filed: May 24, 2001

(51) Int. Cl.[7] ............... G02B 6/36; H01S 3/30
(52) U.S. Cl. ........... 359/341.31; 359/134; 359/160; 372/3; 372/6
(58) Field of Search ............... 359/124, 134, 359/160, 334, 341.31; 372/3, 6, 70; 385/122

(56) References Cited

U.S. PATENT DOCUMENTS

| | | | | |
|---|---|---|---|---|
| 5,191,628 A | * | 3/1993 | Byron | 385/23 |
| 5,623,508 A | * | 4/1997 | Grubb et al. | 372/3 |
| 6,163,636 A | * | 12/2000 | Stentz et al. | 385/24 |
| 6,424,455 B1 | * | 7/2002 | Dmitri | 359/334 |
| 6,459,529 B1 | * | 10/2002 | Grubb et al. | 359/341.3 |
| 2002/0063948 A1 | * | 5/2002 | Islam et al. | 359/344 |
| 2002/0097480 A1 | * | 7/2002 | Dominic et al. | 359/333 |

FOREIGN PATENT DOCUMENTS

WO  WO 01/52372  * 7/2001

OTHER PUBLICATIONS

Emori et al, OAA Meeting, pp. 8–10, pp. 09IC 1–1, Jul. 12, 2001.*

* cited by examiner

Primary Examiner—Nelson Moskowitz
(74) Attorney, Agent, or Firm—Barnes & Thornburg

(57) ABSTRACT

In a first aspect, a Raman amplifier is pumped using pumps just above and below the fiber water peak. This enables lower power pumps to be used, as the high attenuation is avoided. In a second aspect, a first pump provides a signal having a first wavelength and a first power, and a second pump source provides a plurality of signals, each having a power lower than the first power and a wavelength in a range approximately one Stokes shift higher than the first wavelength. In this way, the second pump source signals are amplified by the Raman effect by the first pump source signal, and the amplified second pump source signals cause signal amplification. The amplified second pump source signals can then include wavelengths above and below the water peak.

11 Claims, 2 Drawing Sheets

RAMAN AMPLIFICATION

FIELD OF THE INVENTION

This invention relates to Raman amplification, for example in optical amplifiers or fiber lasers, and particularly to optical amplifiers for amplification across a wide wavelength band.

BACKGROUND OF THE INVENTION

Various rare-earth doped optical amplifiers are known, such as Erbium or Erbium-Ytterbium doped fibers, and these are used to compensate for the fiber link and splitting losses within optical communications systems. Pump light from a pump source is used to excite the dopant atoms in the fiber. Emission of energy from the excited atoms is stimulated by the incident signal, and this emission results in amplification of the signal.

The gain of rare-earth doped fibers as a function of the wavelength of the signal to be amplified typically includes a maximum gain in the form of a plateau, which provides the most useful operating region of the amplifier. It is desirable to provide a flat gain over the operating wavelength range, and various gain flattening filters are used for this purpose. However, the width of the plateau in the gain profile provides a limitation to the range of wavelengths for which the amplifier can be used.

The characteristics of practical amplifiers have lead to the definition of three wavelength bands: the S band (1450 nm–1520 nm); the C band (1527 nm–1563 nm); and the L band (1570 nm–1603 nm). A 7 nm guard band is provided between the bands. Different rare-earth dopants will provide different gain profiles, and amplifier arrangements have been proposed which place different types of amplifier in parallel, so that amplification across a broader wavelength range can be achieved. However, practical rare-earth amplifiers have not yet been developed for the S-band.

A Raman amplifier is another known amplifier configuration. This amplifier uses conventional fiber, which is may be co- or counter-pumped to provide amplification over a wave range which is a function of the pump wavelength. The Raman amplifier relies upon forward or backward stimulated Raman scattering. Typically, the pump source is selected to have a wavelength of around 100 nm below the wavelength over which amplification is required. This type of amplifier has the advantage that it does not attenuate signal outside the wavelength range over which amplification takes place, and can also be used amplifying a wide range of wavelengths, including the S-band.

A first problem with the Raman amplifier is the need for the pump source to be provided at around 100 nm below the amplification band. When a Raman amplifier is used for amplifying the S-band, the required pump wavelength will fall close to the water peak of the fiber (typically between 1375 nm and 1385 nm). As a result, there is a high level of attenuation of the pump signal, so that a high power pump is required, for example approximately 3 W.

Although fibers are available with water peaks removed, these are not suitable for S-band Raman amplifiers because the dispersion zero wavelength falls within the band of amplification. Within fiber lasers, water peak generation can be reduced by making gratings using Deuterium as a sensitising agent instead of Hydrogen. This can be prohibitively expensive. There is therefore a need to reduce the effect of the water peak for a Raman amplifier being used for the S-band and for Raman fiber lasers.

A second problem with Raman amplifiers is the need for high power pump sources. In particular, in order to obtain a flat gain profile over the wavelength range of interest (which may be any of the wavelength bands), multiple pump wavelengths are required, and with individually selectable pump powers. This has in the past required a number of high power pump sources, and it may be difficult in practice to implement pump sources of the required pump wavelength and power.

SUMMARY OF THE INVENTION

According to a first aspect of the invention, there is provided a Raman optical amplifier comprising a fiber and a pump source arrangement for providing first and second pump source signals to the fiber, the first pump source signal having a wavelength between 1355 nm and 1375 nm and the second pump source signal having a wavelength between 1385 nm and 1405 nm.

This arrangement provides two pump wavelengths, one on either side of the water peak wavelength of the fiber. This enables lower power pump sources to be used to for S-band amplification, and thereby improves the gain and efficiency of the amplifier. This avoids the need to use specialised fibers with the water peak suppressed.

The first pump source signal may have a wavelength of approximately 1365 nm and the second pump source signal may have a wavelength of approximately 1389 nm. These are thus on either side of the typical water peak region of 1375 nm to 1385 nm.

The first pimp source signal may have a power of 300 mW–800 mW and the second pump source signal may have a power of 300 mW–600 mW.

According to a second aspect of the invention, there is provided a Raman fiber laser comprising a fiber forming a laser cavity, a pump source, and a plurality of gratings at one or both ends of the laser cavity for reflecting selected wavelengths, wherein one of the gratings is arranged to reflect a signal wavelength below 1375 nm and the next grating in the path of a signal within the cavity is arranged to reflect a wavelength above 1385 nm.

In this way, the wavelength shifts within the laser cavity avoid the water peak band of wavelength, thereby reducing the high attenuation within that wavelength band.

The invention also provides a method of providing Raman optical amplification, the method comprising:
    providing first and second pump source signals to a fiber, the first pump source signal having a wavelength between 1355 nm and 1375 nm and the second pump source signal having a wavelength between 1385 nm and 1405 nm.

According to a third aspect of the invention, there is provided a Raman optical amplifier comprising a fiber, a first pump source arrangement for providing a pump source signal to the fiber and a second pump source arrangement for providing a plurality of pump source signals. The first pump source provides a first pump source signal with a first wavelength and a first power, and the signals of the second pump source arrangement each have a power lower than the first power and a wavelength in a range approximately one Stokes shift higher than the first wavelength. The second pump source signals are thereby amplified by the Raman effect by the first pump source signal, and these amplified second pump source signals in turn cause signal amplification.

This arrangement provides a single high power pump source, which results in amplification of a second group of lower power pump signals. These have the desired wavelengths and intensities so that after they have been amplified, they provide the required signal amplification. The first power is preferably greater than 2 W, and the power of each pump source signal of the second pump source arrangement is less than 10 mW. The second pump source arrangement can then comprise a plurality of semiconductor lasers, whereas the high power first pump will comprise a fiber laser.

The first wavelength may be approximately 1380 nm, and the second wavelengths may be in the range 1420 nm to 1500 mm. This provides a scheme suitable for amplifying the C-band, although other wavelengths may be selected to enable amplification of the other bands.

The third aspect of the invention also provides a method of providing Raman amplification comprising:

providing first a pump source signal in a first wavelength range; and providing second pump source signals in a wavelength range approximately one Stokes shift higher in wavelength, the second pump source signals being amplified by the Raman effect as a result of the first pump source signal, wherein a signal is amplified by the Raman effect as a result of the amplified second pump source signals.

The amplifiers of the invention can be used in a wavelength division multiplex (WDM) optical communications system comprising a transmitter for generating signal radiation of wavelength in an operating wavelength range, a receiver for receiving for detecting the signal radiation, and an optical fiber link between the transmitter and the receiver. One or more of the optical amplifiers are provided in the link.

BRIEF DESCRIPTION OF THE DRAWINGS

Examples of the invention will now be described in detail with reference to the accompanying drawings, in which.

DETAILED DESCRIPTION OF THE INVENTION

Figure 1:
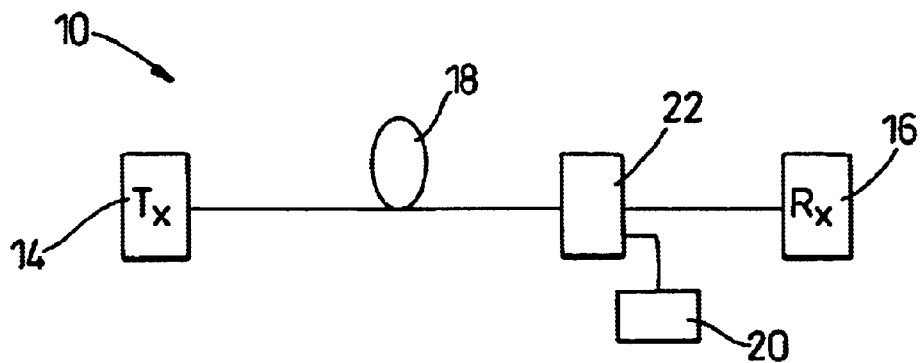
FIG. 1 shows a Raman amplifier according to one aspect of the invention.

FIG. 1 shows a first amplifier arrangement according to the invention, in which the Raman amplifier 10 is placed between a transmitter 14 and a receiver 16. The signals amplified by the arrangement will have components at a number of wavelengths, as defined by the ITU grid, and the amplifier provides amplification in the S-band. If amplification of other bands is required, additional amplifiers may be provided in series or in parallel with the Raman amplifier shown.

The Raman amplifier essentially comprises a length of transmission fiber 18, for example 10 km of non-zero dispersion shifted fiber. The fiber is, in the example shown, counter-pumped by a high power pump source 20 providing a pump signal coupled into the signal path using an optical coupler 22.

In accordance with the invention, the pump source 20 provides (at least) two pump source signals to the fiber. The first pump source signal has a wavelength just below the water peak of the transmission fiber, in particular between 1355 nm and 1375 nm, and the second pump source signal has a wavelength just above the water peak of the transmission fiber, in particular between 1385 nm and 1405 nm. This enables the losses present around the water peak to be overcome.

The powers of the two pump signals can be adjusted to provide the desired pin profile in the amplification band (1450 nm to 1520 nm). As one specific implementation, the first pump source signal can have a wavelength of 1365 nm and a power of around 720 mW, and the second pump source signal can have a wavelength of 1389 nm and a power of around 450 mW. The pump source signals are obtained by shifting the wavelength of the output of a Ytterbium laser (1064 nm) using Bragg gratings in a grating based laser. In such a device, 1064 nm pump light is coupled into a length of Dispersion shifted fiber, for example 7.5 km. Bragg gratings with very high reflectance maintain the light in the fiber loop until it has undergone a number of Stokes shifts up to the required wavelength. The last Bragg grating has a reflectance of 50%.

The use of two pump signals on either side of the water peak avoids the need for very high pump powers, which are required when the wavelength falls within the water peak of the fiber. In particular, the two pump signals can be less than 1 W to provide the required amplification for practical communications systems.

Figure 2:
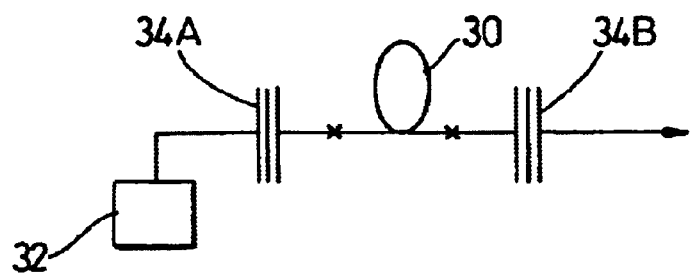
FIG. 2 shows a fiber laser according to the invention.

The invention can also be applied to Raman fiber lasers. As shown in FIG. 2, a Raman fiber laser according to the invention comprises a fiber 30 forming a laser cavity, a pump source 32, and a plurality of gratings 34A and 34B at each end of the laser cavity for reflecting specific wavelengths. The Raman effect results in an increase in wavelength by one Stokes shift, as the signal travels along the cavity. This gives rise to a narrow band of wavelengths when the signal reaches the grating at the end of the cavity, and the Bragg grating then reflects one specific wavelength within the band. The gratings and the starting pump wavelength are arranged such that one of the Stokes shifts is from a wavelength below 1375 nm to a wavelength above 1385 nm, thereby "hopping" over the water peak of the fiber.

The pump source provides a wavelength which is selected in combination with the grating characteristics, as the gratings need to be tuned to wavelengths which are integral numbers of Stokes shifts longer than he original pump source wavelengths. The single pump source 32 may again provide a 1064 nm output, provided the successive Stokes shifts result in the wavelength "hopping" over the water peak. The 1064 nm pump light is coupled into DSF fiber 30, and the Bragg gratings have very high reflectance and maintain the light in the loop until it has undergone the appropriate number of Raman shift, up to the required output wavelength and intensity, which lies above the water peak of the DSF fiber.

By ensuring that one of the wavelength shifts hops over the water peak band of wavelengths, the high losses present within that band of wavelengths can be avoided.

Figure 3:
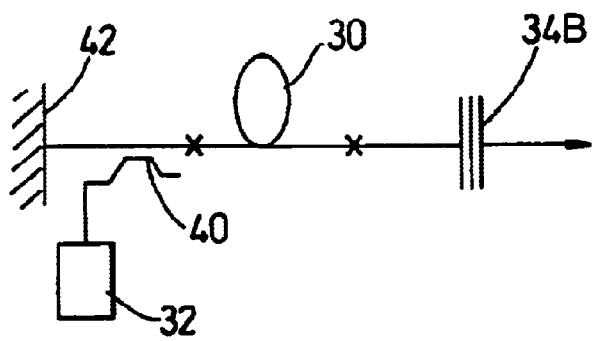
FIG. 3 shows a modification to the fiber laser of FIG. 2.

Although two sets of gratings are shown, the first set of gratings 34A may instead comprise a coupler 40 and a reflector 42 as shown in FIG. 3, so that a single set of gratings 34B is required.

Figure 4:
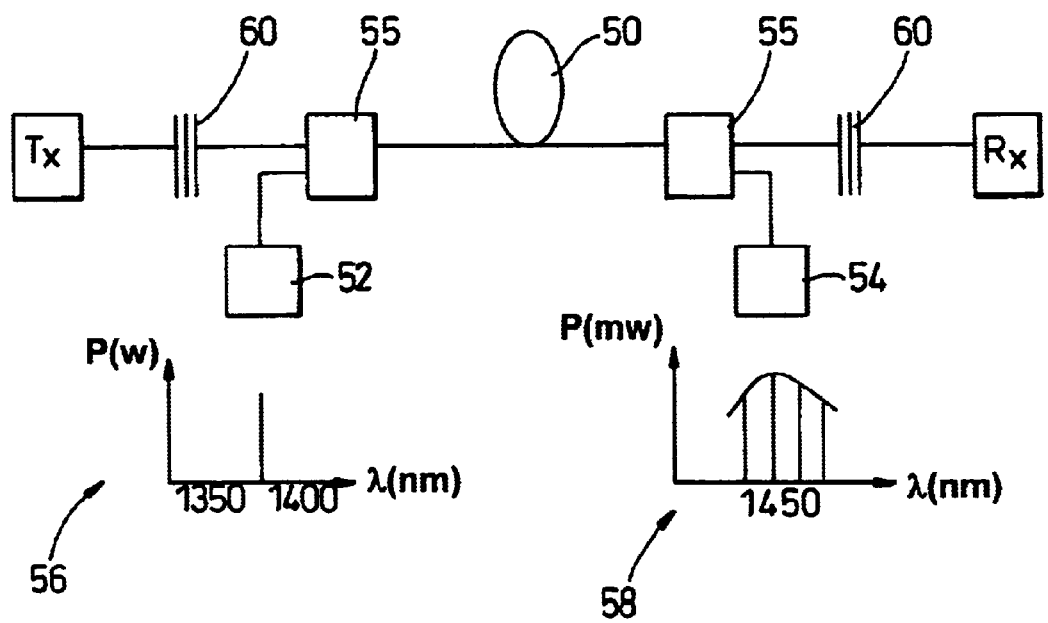
FIG. 4 shows Raman amplifier according to another aspect of the invention.

FIG. 4 shows an amplifier arrangement according to the second aspect of the invention, in which the need for multiple high power pump sources in a Raman amplifier is avoided. The amplifier comprises a fiber 50 (for example of length 3 km to 10 km), a first pump source arrangement 52 for providing a pump source signal to the fiber and a second pump source arrangement 54 for providing a plurality of pump source signals to the fiber. The pump signals are coupled to the fiber using optical couplers 55.

An example will be describe with wavelengths selected to provide C-band amplification. The first pump source arrangement 52 provides a pump signal with a wavelength between 1350 nm and 1400 nm, for example 1380 nm , and has high power, for example 3 W. This pump signal results in Raman amplification of a wavelength band of around 1420 nm to 1490 nm. This wavelength band is below the C-band and therefore does not provide useful amplification of WDM channels to be amplified. However, the wavelengths amplified fall within the range suitable for Raman pump sources for amplifying the C-band.

The second pump source arrangement provides pump source signals in the wavelength band amplified by the high power pump signal, namely in the band 1420 nm to 1490 nm. A number of pump signals are provided, for example four, to provide a required gain profile. The pump signals of the second pump source arrangement 54 have a lower power, for example less than 10 mW.

The pump source signal profiles are shown schematically as 56 and 58.

The high power pump source arrangement 52 comprises a fiber laser, whereas the low power second pump source arrangement 54 can be implemented as semiconductor lasers. The low power signals are amplified to the order of 0.5 W, and these 0.5 W pump signals in turn result in Raman amplification of the C-band (1527 nm–1563 nm).

Co- and counter-pumping in Raman amplifiers is known, and the invention in this aspect essentially involves reducing the pump wavelength of one pump source by one Stokes shift, and providing as the other pump source an array of low power pump signals at wavelength suitable for pumping the signal band. This approach can be implemented for any wavelength band. Furthermore, if providing amplification in the S-band, the low power pump signals can be provided on either side of the water peak, in the manner described above. Signal pumping results with multiple pumps, and the pump powers can be controlled independently by selecting appropriate power levels for the low power pump signals. This enables large bandwidth amplification with a flat gain response to be achieved.

The low power pump signals can be controlled dynamically to provide a feedback gain control scheme.

As shown in FIG. 4, gratings 60 may be provided to contain the pump signals within the amplifier, thereby increasing the pump efficiency.

Figure 5:
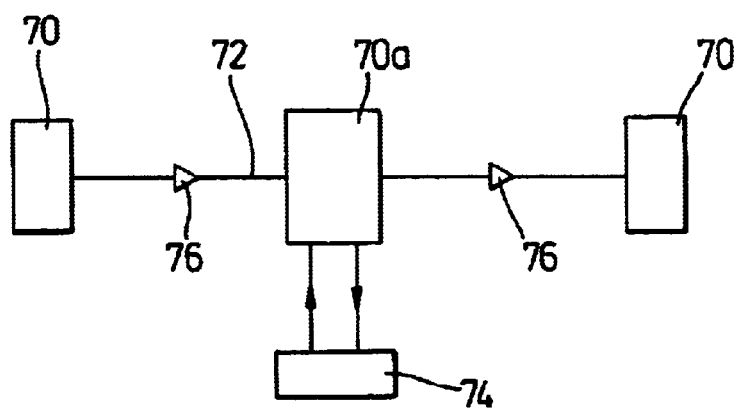
FIG. 5 shows a optical communications system using amplifiers of the invention.

FIG. 5 shows a WDM optical communications system comprising a number of nodes 70 interconnected by optical fibers 72. The nodes provide routing functions as well as allowing the adding or dropping of signals at the node sites. For example, node 70a provides add and drop functions to a client unit 74. Optical amplifiers 76 of the invention are located along the fiber paths and/or in the nodes. The nodes will of course include additional optical processing elements, such as for chromatic dispersion compensation, PMD compensation and power equalisation.

Although specific amplifier configurations have been shown in the drawings, other arrangements are possible. In particular, the choice of whether co- or counter pumping is appropriate will be apparent to those skilled in the art. In FIG. 4, the high power pump is used as the co-pump source and the low power pumps are used as the counter-pump source. This arrangement may be reversed.

What is claimed is:

1. A Raman optical amplifier comprising a fiber and a pump source arrangement for providing first and second pump source signals to the fiber, the first pump source signal having a wavelength between 1355 nm and 1375 nm and a power of 300 mW–800 mW and the second pump source signal having a wavelength between 1385 nm and 1405 nm and a power of 300 mW–600 mW.

2. An amplifier as claimed in claim 1, wherein the first pump source signal has a wavelength of approximately 1365 nm and the second pump source signal has a wavelength of approximately 1389 nm.

3. A method of providing Raman optical amplification, the method comprising:

providing first and second pump source signals to a fiber, the first pump source signal having a wavelength between 1355 nm and 1375 nm and a power of 300 mW–800 mW and the second pump source signal having a wavelength between 1385 nm and 1405 nm and a power of 300 mW–600 mW.

4. A Raman optical amplifier comprising a fiber, a first pump source arrangement for providing a first pump source signal to the fiber, the first pump source signal having a first wavelength and a first power, and a second pump source arrangement for providing a plurality of second pump source signals, each having a power lower than the first power and a wavelength in a range approximately one Stokes shift higher than the first wavelength, the second pump source signals thereby being amplified by the Raman effect by the first pump source signal.

5. An amplifier as claimed in claim 4, wherein the first power is greater than 2 W, and the power of each pump source signal of the second pump source arrangement is less 10 mW.

6. An amplifier as claimed in claim 5, wherein the second pump source arrangement comprises a plurality of semiconductor lasers.

7. An amplifier as claimed in claim 4, wherein the fiber has a length of 3 to 10 km.

8. An amplifier as claimed in claim 4, wherein the first wavelength is approximately 1380 nm, and the second wavelengths are in the range 1420 nm to 1500 nm.

9. A method of providing Raman amplification, the method comprising:

providing first a pump source signal in a first wavelength range wherein the power of the first pump source signal is greater than 2 W; and providing a second pump source signal in a wavelength, range approximately one Stokes shift higher in wavelength, wherein the power of the second pump source signal is less than 10 mW, the second pump source signal being amplified by the Raman effect by the first pump source signal, wherein a signal is amplified by the Raman effect as a result of the amplified second pump source signal.

10. An optical amplification arrangement comprising:

a Raman optical amplifier comprising a fiber, a first pump source arrangement for providing a first pump source signal to the fiber, the first pump source signal having a first wavelength and a first power, wherein the power of the first pump source signal is greater than 2 W, and a second pump source arrangement for providing a plurality of second pump source signals, each, having a power less than 10 mW and a wavelength in a range approximately one Stokes shift higher than the first wavelength, the second pump source signals thereby being amplified by the Raman effect by the first pump source signal;

a transmitter for generating signal radiation of wavelength in an operating wavelength range;

a receiver for receiving the signal radiation; and an optical fiber link between the transmitter and the receiver, wherein said Raman optical amplifier is provided in the link.

11. A method as claimed in claim 9, comprising providing a plurality of second pump source signals, each having a power less than 10 mW.

* * * * *